July 10, 1956

R. L. WHITE 2,753,885

LIQUID LEVEL INDICATOR

Filed Nov. 28, 1952

INVENTOR.
*R. L. White*
BY
*Hudson & Young*
ATTORNEYS

July 10, 1956

R. L. WHITE 2,753,885

LIQUID LEVEL INDICATOR

Filed Nov. 28, 1952

INVENTOR.
R. L. White
BY
Hudson & Young
ATTORNEYS

July 10, 1956 — R. L. WHITE — 2,753,885
LIQUID LEVEL INDICATOR
Filed Nov. 28, 1952 — 3 Sheets-Sheet 3

INVENTOR.
R. L. White
BY Hudson & Young
ATTORNEYS

United States Patent Office 2,753,885
Patented July 10, 1956

2,753,885

LIQUID LEVEL INDICATOR

Roy Lucien White, Phillips, Tex., assignor to Phillips Petroleum Company, a corporation of Delaware Application November 28, 1952, Serial No. 322,949

4 Claims. (Cl. 137—414)

This invention relates to apparatus for indicating the level of fluids in vessels. In one specific aspect it relates to apparatus for locating the interface between two fluids of different specific gravities.

In the use of liquid level gages having a float or displacement member disposed within a vessel containing liquid whose level is being measured and an indicator positioned outside the vessel, it is often important to seal the indicating apparatus from the fluids in the vessel. This is particularly true when the fluids encountered are either corrosive or explosive. In the past some effort has been made to solve this problem by the use of elaborate packing devices in the form of stuffing boxes, but these devices have not proved entirely satisfactory because of the inherent frictional forces which reduce the sensitivity of the measuring instrument. Other attempts have been made to provide various forms of electronic level indicators, but these instruments are costly and are not entirely safe when employed in the vicinity of explosive atmospheres. It is toward overcoming these past difficulties that the present invention is primarily directed.

In accordance with this invention a float or fluid displacement member of predetermined weight is disposed in a vessel containing a fluid, the level of which is to be measured. Attached to this float is a rotatable arm pivotally mounted outside the fluid containing vessel. A torsion tube is secured to the rotatable arm at its pivot point thereby providing an output rotation representative of the level of fluid in the vessel. This output rotation can be employed to actuate any suitable telemetering transmitter for purposes of recording the measured level or controlling a selected process variable affecting the level. In order to prevent the fluids under measurement from contacting the pivotally mounted torsion tube a flexible diaphragm is interposed between the rotatable arm and its housing. The region behind the diaphragm is filled with a noncompressible sealing fluid such as oil or grease which serves the dual functions of preventing excessive pressure from being applied to the diaphragm and further aiding in sealing the torsion tube from the fluids in the vessel. The float and float arm conveniently are constructed of materials which are not corroded by the fluids being measured.

Accordingly, it is an object of this invention to provide an improved liquid level gage particularly adapted to be used in measuring levels of corrosive fluids.

Another object is to provide sealing mechanism for use with a rotatable displacement member which prevents the passage of fluid therepast while exerting negligible frictional forces on the rotatable member.

A further object is to provide a liquid level indicator of simplified durable construction, which is reliable in operation, and which employs a minimum number of moving parts.

Various other objects, advantages and features of this invention should become apparent from the following detailed description taken in conjunction with the accompanying drawing in which.

Figure 1:
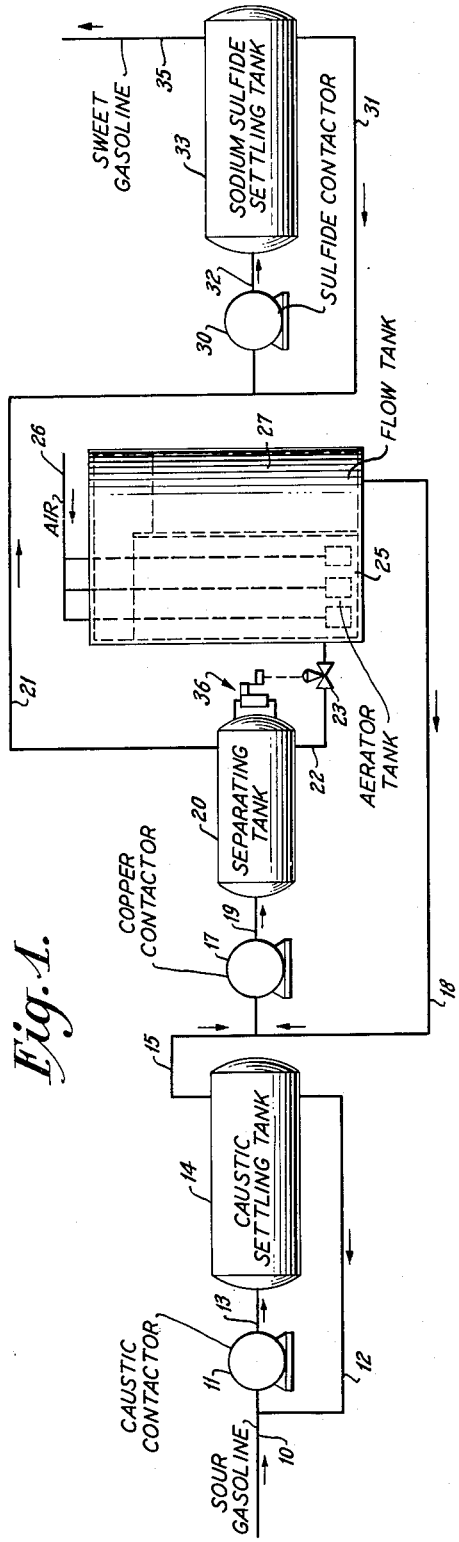
Figure 1 is a schematic flow diagram of a chemical process to which the liquid level indicator of this invention is particularly adapted for control purposes.
Figure 3:
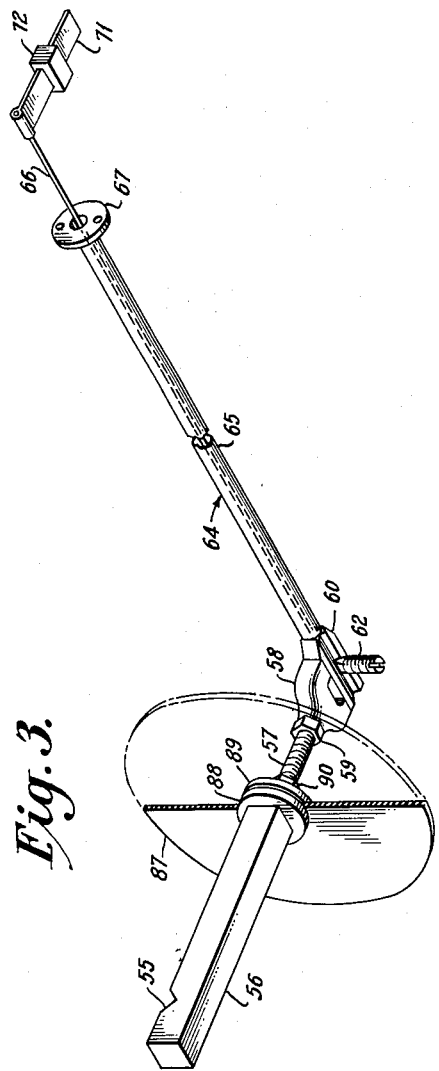
Figure 3 is an enlarged view showing a feature of this invention.

Referring now to the drawing in detail and to Figure 1 in particular, there is illustrated a schematic flow diagram of a copper sweetening process employed for treating gasoline. Sour gasoline which may contain hydrogen sulfide, free sulfur, and mercaptans is passed through a line 10 to a centrifugal pump 11 wherein the gasoline is contacted with a caustic solution to remove the hydrogen sulfide and free sulfur, the caustic solution entering pump 11 through a line 12. The gasoline then passes through a line 13 to a caustic settling tank 14 wherefrom the overhead gasoline product is withdrawn through a line 15 and the caustic is removed through line 12 to be recycled to pump 11. The gasoline from line 15 enters a second centrifugal pump 17 wherein it is contacted with a cupric chloride solution to oxidize the mercaptans, the cupric chloride solution entering pump 17 through a line 18. The treated gasoline then passes through a line 19 to a separating tank 20 wherefrom the sweetened gasoline leaves tank 20 through an overhead line 21 and the resulting cuprous chloride solution is transmitted through a line 22 having a valve 23 disposed therein to an aerator tank 25. Air enters tank 25 through a line 26 to effect a regeneration of a cuprous chloride solution into cupric chloride which in turn passes out through a flow tank 27 into line 18 for recycling through pump 17. The sweetened gasoline passes through line 21 into a third centrifugal pump 30 wherein it is contacted with a sodium sulfide solution to remove any traces of copper, the sulfide solution entering pump 30 through a line 31. The output from pump 30 passes through a line 32 into a sodium sulfide settling tank 33 wherefrom the sweet gasoline is removed overhead through a line 35.

It has been found in operation that if the cuprous chloride level in settling tank 20 is not controlled in a positive manner some of the solution may rise and be carried overhead with the gasoline into the sulfide wash tank. When this happens the sodium sulfide is contaminated by the cuprous chloride which necessitates the replacement of the sodium sulfide solution. Thus it is desirable to regulate the cuprous chloride-gasoline interface in tank 20 by some type of automatic control mechanism. Due to the corrosive nature of copper chloride, conventional liquid level controllers have not proved to be satisfactory. However, an improved liquid level controller is provided in accordance with this invention which regulates the flow through valve 23 in response to the level of the interface in tank 20.

Control mechanism 36 is illustrated in detail in Figures 2, 3, 4, and 5. A float cage 40 is connected by conduits 41 and 42 to regions of tank 20 which are below and above, respectively, the interface 53 between the cuprous chloride 43 and the gasoline 44 contained within tank 20. Cage 40 comprises a lower hollow cylindrical section 45 which is connected to conduit 41 by a plug 46 and an enlarged hollow cylindrical section 48 which is threaded to section 45 at its lower end and to conduit 42 at its upper end. A washer 50 also is threaded to conduit 42 and is secured to section 48 by a plurality of bolts 51. A hollow float 52 is disposed within cage 40 and is constructed to have a specific gravity such as to float at the interface 53 between the two liquids. The upper end of float 52 is supplied with a hook 54 which rests in a groove 55, see Figure 3, of a float arm 56 which thus suspends float 52 within cage 40. The end of float arm 56 opposite groove 55 is threaded to receive a nipple 57. A bifurcated frame member 58 is threaded to the opposite end of nipple 57 and held in place by a lock nut 59. The hollow portion of member 58 receives a fulcrum block 60, the lower surface of which is grooved to pivot about a knife edge bearing 62. A torsion tube 64, which comprises a hollow metallic tube 65 having a rotary shaft 66 contained therein, is rigidly secured at one end to fulcrum block 60, as by welding. Thus, rotation of block 60 about bearing 62 imparts a rotation to both tube 65 and shaft 66. However, the opposite end of tube 65 is provided with a gasket 67 which is rigidly secured both to tube 65 and to the housing 68 which encloses tube 64. The opposite end of shaft 66, on the other hand, passes freely through gasket 67 and is mounted for rotation by a ball bearing support 70. This outer end of shaft 66 is pinned to a flapper 71 which has an adjustable weight 72 mounted thereon. An adjusting screw 73 engages flapper 71 and is held in place by a support member 74.

Float arm 56 and torsion tube 64 are enclosed within a fluid-tight compartment comprising a nipple 80 which is threaded to section 48 of cage 40 and which extends horizontally therefrom. A flange 81 is threaded to the outer end of nipple 80 and is secured to a second flange 82 by a plurality of bolts 83. Housing 68 is in turn secured to flange 82 by bolts 84. Interposed between flanges 81 and 82 are a gasket 86 and a flexible diaphragm 87, both of which are secured to flange 82 by screws 85. The center of diaphragm 87 is mounted on nipple 57 by a pair of washers 88 and 89 which is positioned by a lock nut 90. Thus diaphragm 87 completely seals housing 68 from float cage 40 and at the same time permits free rotation of float arm 56 about bearing 62. Housing 68 has a small opening therein to mount a grease fitting 91. This allows the interior of housing 68 to be filled with a non-compressible material 92 such as grease or oil.

In operation, float 52 moves up and down with interface 53 and in so doing exerts a downward force on the free end of float arm 56 at groove 55. This in turn causes a turning moment in torsion tube 64 which is equal to the net downward force of the float times the length of float arm 56. Because tube 65 is rigidly clamped to housing 68 by gasket 67 and because fulcrum block 60 is free to rotate with float arm 56, tube 65 is twisted throughout its length while shaft 66 rotates freely. As interface 53 rises in float cage 40 the turning moment applied to the torque tube is decreased such that the tube untwists proportionally. Thus a rise in interface 53 causes a rotation of shaft 66 in one direction whereas a lowering of interface 53 causes a rotation of shaft 66 in a second direction. Because the knife edge bearing 62 is practically frictionless, any change in the level of interface 53 results in a proportional rotation of shaft 66 which provides an indication of the level of interface 53.

Figure 2:
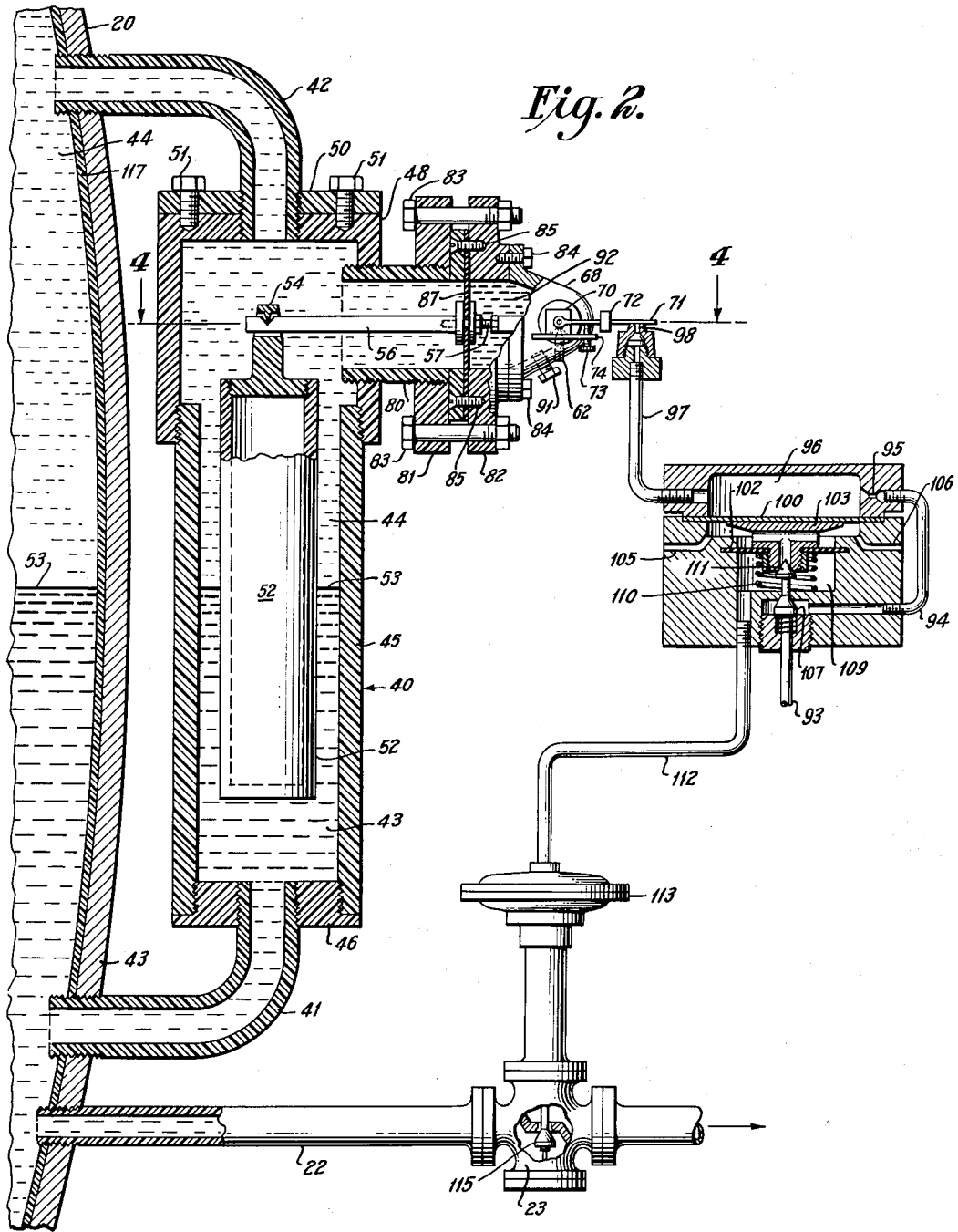
Figure 2 is a view, shown partially in section, of the liquid level indicator together with control mechanism adapted to regulate the flow of fluid in a conduit.
Figure 4:
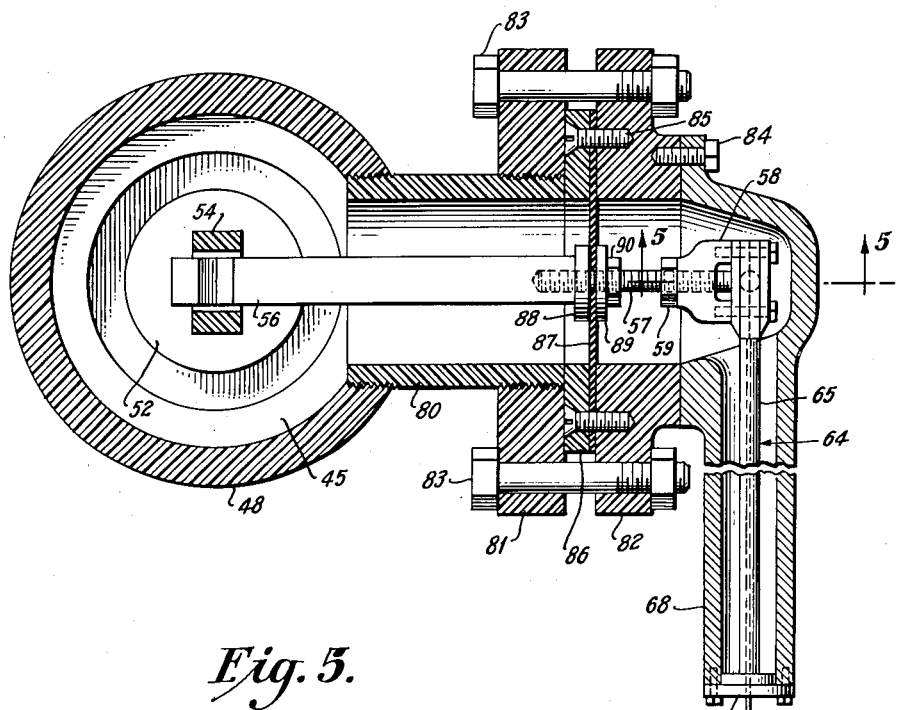
Figure 4 is a view taken along line 4—4 in Figure 2.
Figure 5:
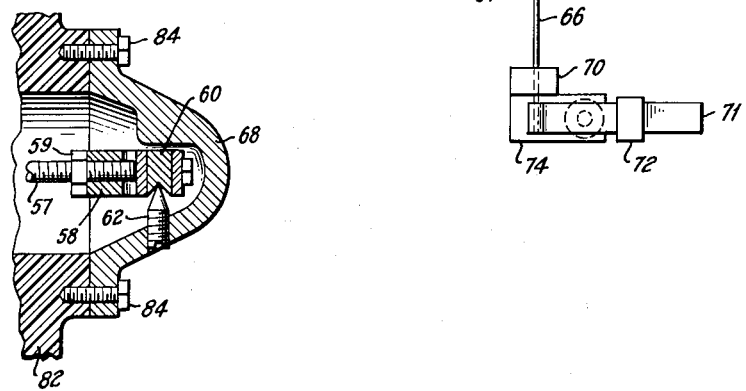
Figure 5 is a view taken along line 5—5 in Figure 4.

The output rotation of shaft 66 can be employed to actuate suitable control mechanism to maintain the level of interface 53 at any preselected position. One particular system by which such control is accomplished is illustrated in Figure 2 wherein the output rotation of shaft 66 actuates suitable pneumatic control mechanism to open and close valve 23 in line 22 so as to drain off liquid 43 as is needed to keep interface 53 from rising above a predetermined level. Air at a constant pressure is applied to the control system through an inlet line 93. A second line 94 containing a fixed orifice 95 communicates between line 93 and a pressure chamber 96. A line 97 communicates at one end with pressure chamber 96 and at the other end with a bleed nozzle 98. Operating air flows through conduits 93 and 94 and orifice 95 into chamber 96 and thence through line 97 to nozzle 98. Flapper 71 is disposed adjacent nozzle 98 such as to restrict the air flow therethrough when positioned in contact with nozzle 98. Nozzle 98 is of such size as to bleed off the air entering chamber 96 at the same rate as air passes through orifice 95 when flapper 71 is not in engagement therewith. Under this condition there is a zero pressure differential between orifice 95 and nozzle 98. However, as nozzle 98 is restricted by upward movement of float 52, which results in a clockwise rotation of flapper 71, pressure is built up in the system between orifice 95 and nozzle 98. Thus any change in liquid level results in a change in pressure in chamber 96.

The lower wall of chamber 96 is defined by a movable diaphragm 100 which is rigidly connected to a second smaller diameter diaphragm 102 through a float assembly 103 having exhaust ports 105 and 106 contained therein. This double diaphragm assembly is free floating and always pressure balanced. If there is an increase in pressure in chamber 96, as previously mentioned, the diaphragm assembly 103 is pushed downward which results in an inlet valve 107 being opened against its retaining spring which allows pressure from line 93 to enter a second chamber 109 below chamber 96 to exert an upward force on the lower surface of diaphragm 102. Air continues to enter chamber 109 until diaphragm assembly 103 is pushed back to its original position and inlet valve 107 is once again closed. If, on the other hand, there is a decrease of pressure in chamber 96 diaphragm assembly is moved upward by spring 110 to open exhaust valve 111 thereby allowing pressure under the small diaphragm 102 to bleed out through ports 105 and 106 until the diaphragm assembly is once again returned to its original position which closes exhaust port 111. The pressure within chamber 109 is applied through a line 112 to one side of a diaphragm motor valve inlet 113 which in turn moves a valve head 115 within valve 23.

As previously mentioned, any upward movement of interface 53 results in a rotation of shaft 66 which moves flapper 71 to restrict bleed nozzle 98 thereby building up the pressure within chamber 96. This pushes the diaphragm assembly 103 downward to open valve 107. Air from line 93 flows into chamber 109 and thence through line 112 to the diaphragm assembly 113 causing the motor valve head 115 to move downward away from its seat which results in an increased flow of fluid 43 through line 22 into tank 25. If, on the other hand, interface 53 is lowered, the reverse action takes place which results in a closing of valve 23 to restrict the flow through line 22.

Because of the corrosive nature of the copper chloride solution in tank 20 it is essential that all parts exposed to this solution be constructed of a material that is not corroded thereby. Various synthetic resins are available which can serve this purpose. One preferred material is a synthetic tar-acid resin sold under the name "Dilecto grade L" which is a laminated plastic consisting of a solid phenol-formaldehyde condensation resin on a fabric base of cotton fibers. Other suitable materials include polyethylene, glass and metals coated with suitable resins. To avoid corrosion, metal tank 20 is provided with an inner lining 117 of such a resinous material as are all of the level gage components in contact with fluid. These components include conduits 41 and 42, plug 46, cage sections 45 and 48, nipple 80, gasket 86, float arm 56 and float 52. Diaphragm 87 is constructed of any suitable flexible material which is capable of withstanding the corrosive effects of copper chloride. One material that is particularly adapted for this use is Saran, a polyvinylidene chloride plastic. In order to prevent diaphragm 87 from being ruptured by the pressure of the fluid exerted thereagainst, the region of the assembly to the right of the diaphragm is filled with a noncompressible fluid such as grease or oil which is inserted through the opening containing fitting 91. The use of such a sealing material in housing 68 also serves to further seal the region beyond diaphragm 80 from the corrosive liquid.

While this invention has been described in conjunction with a pneumatic control system associated with a torsion tube liquid level indicator for purposes of regulating the valve in an outlet conduit, it should be evident that the principles of this invention are in no way restricted to any particular type of indicating and control mechanism. It should be apparent that there is provided in accordance with this invention a simplified liquid level indicator which is particularly adapted for use with corrosive fluids. While this invention has been described in conjunction with the present preferred embodiment thereof, it is to be understood that this description is illustrative only and not intended to limit the scope of the invention.

What is claimed is:

1. A liquid level gage comprising a float of predetermined weight adapted to be disposed in a vessel containing a fluid, a rod connected at one end to said float and at its opposite end to a fulcrum block, a torsion tube secured at one end to said block, a housing enclosing at least a portion of said rod and said tube, said tube being secured at its end opposite said block to said housing, a rotatable shaft extending through said tube and having one end rigidly secured to the end of said tube which is secured to said block, a flexible diaphragm secured to said rod and extending outwardly therefrom in a plane spaced a substantial distance from said torsion tube and said fulcrum block and extending parallel to the axis of said torsion tube to engage said housing in fluid-tight relation whereby said rod is free to rotate about a fixed point on said fulcrum block and said fulcrum block is sealed from the fluid in which said weight is disposed, and a non-compressible fluid filling the interior of said housing on the side of said diaphragm remote from said float.

2. The combination of claim 1 in which said float, said vessel, and the portion of said rod on the same side of said diaphragm as said float, have at least their surface made of a solid phenol-formaldehyde condensation resin and said diaphragm is made of a polyvinylidene chloride plastic.

3. A liquid level gage comprising a float of predetermined weight adapted to be disposed in a vessel containing a fluid, a rod connected at one end to said float and at its opposite end to a fulcrum block, a torsion tube secured at one end to said block, a housing enclosing at least a portion of said rod and said tube, said tube being secured at its end opposite said block to said housing, a rotatable shaft extending through said tube and having one end rigidly secured to the end of said tube which is secured to said block, a flexible diaphragm secured to said rod and extending outwardly therefrom in a plane spaced a substantial distance from said torsion tube and said fulcrum block and extending parallel to the axis of said torsion tube to engage said housing in fluid-tight relation whereby said rod is free to rotate about a fixed point on said fulcrum block and said fulcrum block is sealed from the fluid in which said weight is disposed, a non-compressible fluid filling the interior of said housing on the side of said diaphragm remote from said float, a drain line connected to said vessel, a drain valve disposed in said line to control flow therethrough and normally biased into closed position, a first pneumatic motor for overcoming said bias and opening said first valve, a constant pressure air supply line, a control valve disposed in one position to connect said air supply line to said first motor and in a second position to bleed said first motor to the atmosphere, a second motor disposed to move said second valve between said positions and connected to said air supply line by a fixed orifice, a bleed nozzle connected to said second motor, and a flapper mounted for rotation on said rotatable shaft and disposed in one rotational position to obstruct said bleed nozzle and thereby actuate said second motor to actuate said second valve to supply air to said first motor to overcome said bias and open said first valve.

4. The combination of claim 3 in which said float, said vessel and the portion of said rod on the same side of said diaphragm as said float, have at least their surface made of a solid phenol-formaldehyde condensation resin and said diaphragm is made of a polyvinylidene chloride plastic.

References Cited in the file of this patent

UNITED STATES PATENTS

| | | |
|---|---|---|
| 1,561,426 | Fischbacher | Nov. 10, 1925 |
| 2,252,029 | Pieper | Aug. 12, 1941 |
| 2,460,503 | Howe | Feb. 1, 1949 |
| 2,599,159 | Breedlove | June 3, 1952 |